(12) United States Patent
Hall (10) Patent No.: US 7,996,576 B2
(45) Date of Patent: Aug. 9, 2011

(54) GENERATING AN IDENTIFIER FOR A SATA DISK

(75) Inventor: Randy Kay Hall, Boulder, CO (US)

(73) Assignee: LSI Corporation, Milpitas, CA (US)

( * ) Notice: Subject to any disclaimer, the term of this patent is extended or adjusted under 35 U.S.C. 154(b) by 504 days.

(21) Appl. No.: 12/151,690

(22) Filed: May 8, 2008

(65) Prior Publication Data

US 2009/0282171 A1 Nov. 12, 2009

(51) Int. Cl.
*G06F 3/00* (2006.01)
*G06F 13/00* (2006.01)
*H03M 7/00* (2006.01)

(52) U.S. Cl. ....... 710/8; 710/3; 710/9; 710/13; 710/104; 341/50; 341/83; 341/90; 707/999.102

(58) Field of Classification Search .......................... None
See application file for complete search history.

(56) References Cited

U.S. PATENT DOCUMENTS 5,692,134 A * 11/1997 Wang et al. .................... 710/104
2007/0027900 A1 * 2/2007 Toyoda et al. ................. 707/102

OTHER PUBLICATIONS

Mark Evans, "introduction to Serial Attached SCSI", Maxtor Corporation, White Paper—May 23, 2003, pp. 1-5.*
Blast.com, "ASCII Character Set", Copyright 2000, pp. 1-2. http://www.blast.com/software/data_pump/DP_ASCII_Char.html.*
Bakke, Mark et al., "iSCSI Naming and Discovery Requirements", Jan. 2001, The Internet Society, pp. 1-18.*
Educated Guesswork, "On Generating Unique Identifiers", Oct. 26, 2006, pp. 1-7 http://www.educatedguesswork.org/movabletype/archives/2006/10/on_generating_u.html.*

* cited by examiner

*Primary Examiner* — Tariq Hafiz
*Assistant Examiner* — Dayton Lewis-Taylor (57) ABSTRACT

In described embodiments, a method of generating an identifier for a disk includes the steps of requesting an ASCII identification string for the disk and generating a padded string by processing the ASCII identification string into a predetermined number of bytes. The padded string is divided into portions and an encoded value is generated for each portion. The two or more encoded values for the portions are combined into a candidate value compatible with a World-Wide Name ("WWN"). The candidate value is compared to a list of previously generated candidate values and if the candidate value differs from the values in the list, the candidate value is included in the list of generated values and the candidate value is provided as the system-wide name for the disk.

11 Claims, 5 Drawing Sheets

GENERATING AN IDENTIFIER FOR A SATA DISK

BACKGROUND OF THE INVENTION

1. Field of the Invention

The present invention relates generally to devices coupled to a network or system, and, in particular, to generating an identifier conforming to, for example, a World-Wide Name ("WWN") format for such network or system.

2. Description of the Related Art

In a computer hardware system, a host controller connects a host system (the computer) to other devices via a peripheral bus. For example, a Small Computer System Interface ("SCSI") host controller connects a SCSI disk to a computer via a SCSI peripheral bus. The host controller communicates between the SCSI bus and the host computer's internal bus, typically by issuing commands to the devices attached to the SCSI bus.

In a computer system with multiple peripheral devices, each attached device generally requires a unique identifier. Certain device interface technologies support such a unique identifier. For example, a Serial Attached SCSI ("SAS") device has a globally unique identifier, called a World-Wide Name ("WWN"), assigned by the device manufacturer. The WWN uniquely identifies each SAS device attached to an array network in a manner similar to a MAC address uniquely identifying an Ethernet device on an Ethernet network.

Each WWN is an 8-byte number derived from a 3-byte Organizationally Unique Identifier ("OUI") that is obtained from the Institute of Electrical and Electronics Engineers ("IEEE") Registration Authority. The OUI is subsequently used by a vendor or manufacturer to uniquely identify itself. Further, using the other five bytes of the WWN allows the manufacturer to assign a globally unique identifier to a particular piece of equipment. All SAS devices are programmed with a WWN. The WWN is reported to the host system on page 83 of the SCSI Inquiry command.

Serial Advanced Technology Attachment ("SATA") devices can generally be used interchangeably with SAS devices. SATA devices generally offer slower data transfer rates than SAS devices, but, due to their lower cost, SATA devices are prevalent in many systems. Many, but not all, SATA devices also have a WWN assigned by the device manufacturer. SATA devices that do not support a WWN might not exhibit reliable performance in computer systems that require a WWN because such devices cannot be uniquely identified and configured by the computer system.

However, SATA devices are programmed with an ASCII identification string. The ASCII identification string is reported to the host system on page 83 of the SCSI Inquiry command. The ASCII identification string is assigned by the manufacturer and is unique for each disk. The ASCII identification string includes a vendor ID, a disk type ID and a disk serial number. However, this ASCII identification string is not in a format that is compatible with the WWN, and thus cannot be used to create a unique identifier.

SUMMARY OF THE INVENTION

The present invention relates to generating an identifier for, for example, a SATA disk attached to an array system.

In an exemplary embodiment, the present invention provides an identifier by requesting an identification string and then generating a padded string to process the identification string into a predetermined number of bytes. The padded string is then divided into portions and an encoded value is generated for each portion. The two or more encoded values are combined into a candidate value. The candidate value is compared to a list of previously generated candidate values, and, if the candidate value differs from values in the list, the candidate value is included in the list and is provided as a system-wide name. The system-wide name is a disk identifier or serial number that enables the system to recognize the appropriate disk for system transactions. For example, the system-wide name might be compatible with a World-Wide Name ("WWN").

In another exemplary embodiment, the present invention provides an identifier by requesting an identification string and generating a padded string by truncating the identification string to be, for example, 68 bytes long and then padding the identification string by adding, for example, 4 bytes to the least significant end of the string. The padded string is then divided into, for example, six 12-byte substrings from the most significant end to the least significant end of the padded string, and each substring is then divided into four 3-byte pieces from the most significant end to the least significant end of the substring. An encoded value is then generated for each 3-byte piece by converting each byte of each 3-byte piece from a standard character set to, for example, a more limited radix-39 character set, and, if a byte does not fit within the radix-39 character set, setting the byte to a predetermined value. This predetermined value is chosen such that it does not make the calculation of the hash overflow the memory register. For example, the predetermined value is normally zero, but other suitable values can be used. While the present embodiment utilizes a radix-39 character set, other character sets, such as radix-40, are possible for other embodiments.

In a further, exemplary embodiment, an efficient means of encoding the bytes is the use of a look up table containing binary values for the radix-39 characters. The byte is converted to its corresponding radix-39 value. A 16-bit binary hash value is then generated for each byte of each 3-byte piece by multiplying the most significant encoded byte by 1521 ($39^2$), adding the result to the middle encoded byte multiplied by 39, and adding the result to the least significant encoded byte.

A candidate value compatible with a system-wide name is generated by combining the hashed values for each of the four 3-byte pieces of a each substring into an concatenated 64-bit value, combining the concatenated 64-bit values for each substring into one 64-bit candidate value by an exclusive-or operation, swapping the most-significant 32 bits of the candidate value with the least significant 32 bits of the candidate value, and setting the most-significant byte of the candidate value to a predetermined value. The final candidate value is compared to a list of previously generated candidate values and if the candidate value differs from the values in the list, the candidate value is included in the list of generated values and the candidate value is provided as the system-wide name for the disk.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

As described herein, embodiments of the present invention provide for generation of an identifier that conforms to a system-wide name, such as the World-Wide Name ("WWN") format, for use with, for example, a SATA disk coupled to an array system. Since it is desirable for every disk coupled to an array system to have a unique identifier, embodiments of the present invention allow for generation of an identifier compatible with a WWN format. Some, but not all, Serial Advanced Technology Attachment ("SATA") disks support a unique, 64-bit factory-programmed WWN. However, all currently available SATA disks have an ASCII identification string that includes a vendor ID, a disk type ID and a disk serial number. Embodiments of the present invention provide a method to process the ASCII identification string into a value that is compatible with the WWN format.

Figure 1:
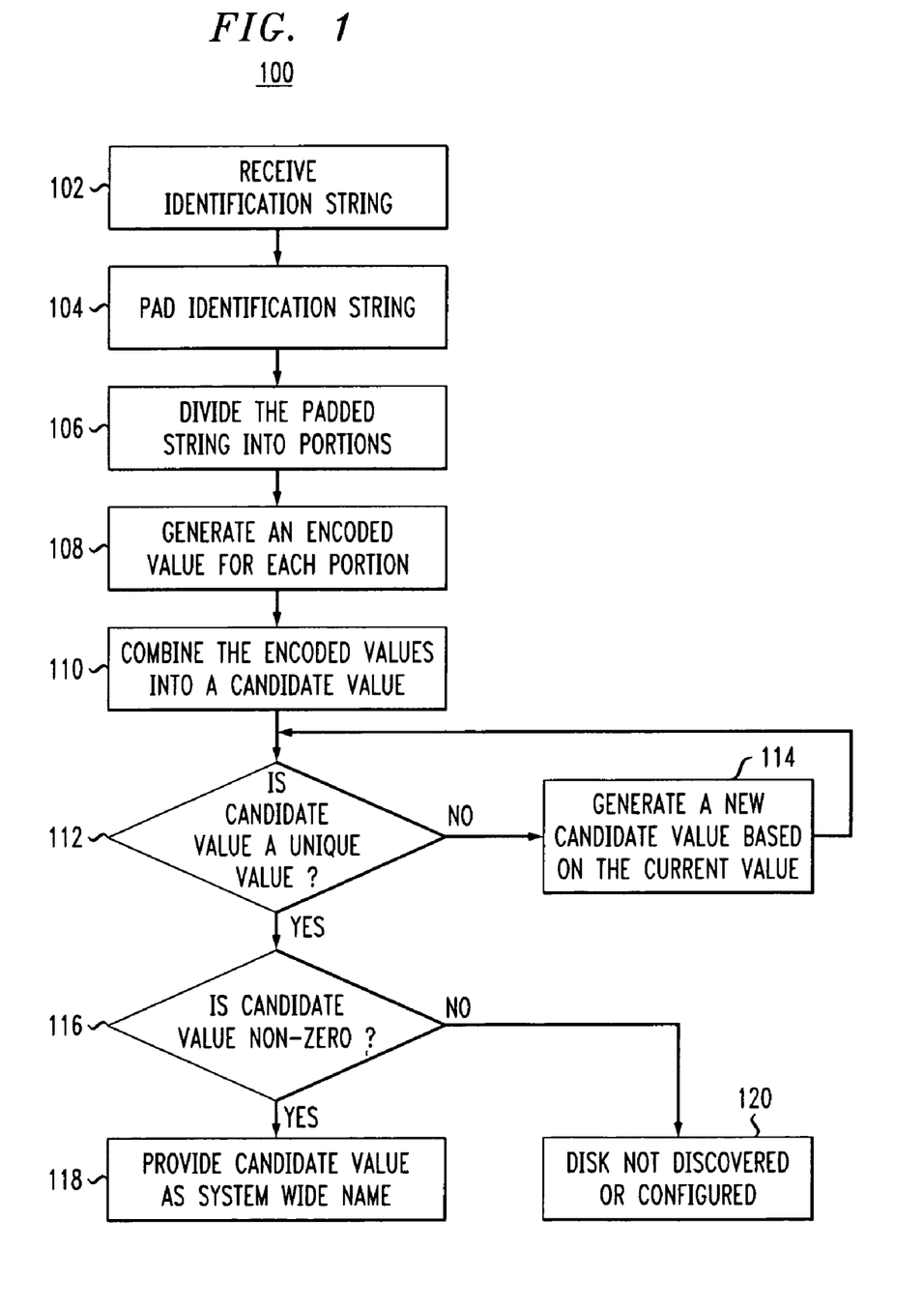
FIG. 1 shows a block diagram of a method for generating an identifier in accordance with an exemplary embodiment of the present invention.

FIG. 1 shows an exemplary block diagram of method 100 for generating an identifier for a SATA disk in accordance with an embodiment of the present invention. At step 102, method 100 queries an attached disk for its ASCII identification string, which might be reported by the disk on page 83 of the SCSI Inquiry command. At step 104, the ASCII identification string is processed into a certain number of bytes. In an exemplary embodiment of the present invention, at step 104, the ASCII identification string is truncated to be 68 bytes long, and is padded by adding 4 bytes to the least significant end of the ASCII identification string. Each of the 4 bytes added to pad the truncated ASCII identification string represents an ASCII space character.

While the embodiment of the present invention is described with respect to an ASCII identification string truncated to 68 bytes, the present invention is not limited and the particular bit/byte string lengths described herein are exemplary only to facilitate an understanding of the present invention. One skilled in the art might readily extend the teachings herein to ASCII strings of other lengths, and might extend the teachings herein to identify devices other than disks that also comprise an ASCII identification string. Further, the identification string need not be in ASCII format, and one skilled in the art might extend the teachings herein to other systems and devices having identification or other arbitrary strings.

At step 106, the padded string is divided into portions. At step 108, an encoded value is generated for each portion. At step 110, the encoded values for each portion are combined into a candidate value. At step 112, a test compares the candidate value to elements of a list of previously generated candidate values. If the test of step 112 determines that the candidate value is a duplicate of a previously generated candidate value, at step 114, a new candidate value is generated based on the current candidate value. Method 100 then returns to step 112 where the new candidate value is compared to the list of previously generated values.

If the test of step 112 determines that the candidate value is not a duplicate of a previously generated candidate value, at step 116, the candidate value is tested to ensure that it is a non-zero value. If the candidate value is zero-valued, there has been an error and method 100 moves to step 120. If the candidate value is non-zero, method 100 moves to step 118, where the candidate value is added to the list of previously generated values, and the candidate value is provided as the system-wide name for the disk.

Figure 2:
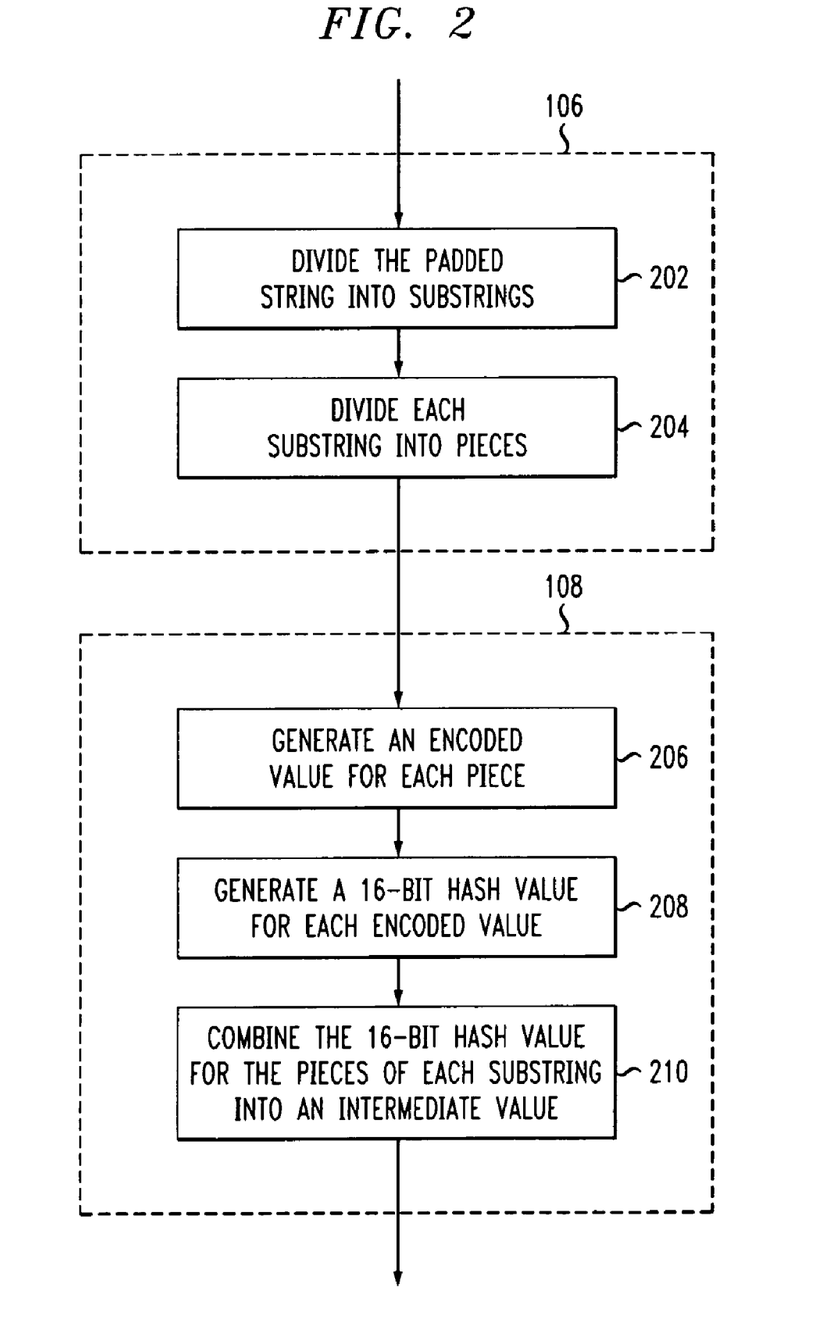
FIG. 2 shows exemplary sub-steps for the method shown in FIG. 1.

FIG. 2 shows exemplary sub-steps for steps 106 and 108 of FIG. 1. As shown in FIG. 2, in step 106, the padded string is divided into substrings at step 202, and each substring is divided into portions at step 204. In step 108, an encoded value is generated for each portion at step 206 and, at step 208, a 16-bit hash value is generated for each encoded value.

At step 206, for example, each byte of each portion is converted from a standard ASCII 128 character set to a radix-39 character set, and, if a byte does not fit the radix-39 character set, setting the byte to a predetermined value. The radix-39 provides a character set of 39 characters, packed three characters per 16 bits of data. Converting from ASCII to radix-39 and back is accomplished with a table lookup. The radix-39 table defines 26 letters, 10 numbers, and 3 special characters with pre-assigned values ranging from 0 and 39. Each three character grouping of text is converted from ASCII to radix-39 values C1, C2 and C3 by looking up the encoded value for each character in the table, then at step 208, the equation $X=(C1*1521)+(C2*39)+C3$ is evaluated to generate the 16-bit hash encoded value for each 3-byte portion.

At step 210, the 16-bit hash values for each portion of a substring are combined into an intermediate value. In an exemplary embodiment, at step 210, the 16-bit hash values for each of the four 3-byte portions are concatenated into one 64-bit intermediate value for each substring. At step 110, the intermediate values for each substring are combined into a candidate value. In an exemplary embodiment, step 110 is an exclusive-or operation combining the six 64-bit intermediate values into one 64-bit candidate value.

Some embodiments of the present invention might advantageously employ table look-up encoding of ASCII bytes, where the table contains binary values for active radix-39 characters and unused slots filled with empty or null values. Again, multiply operations might also advantageously employ table look-up techniques.

Figure 3A:
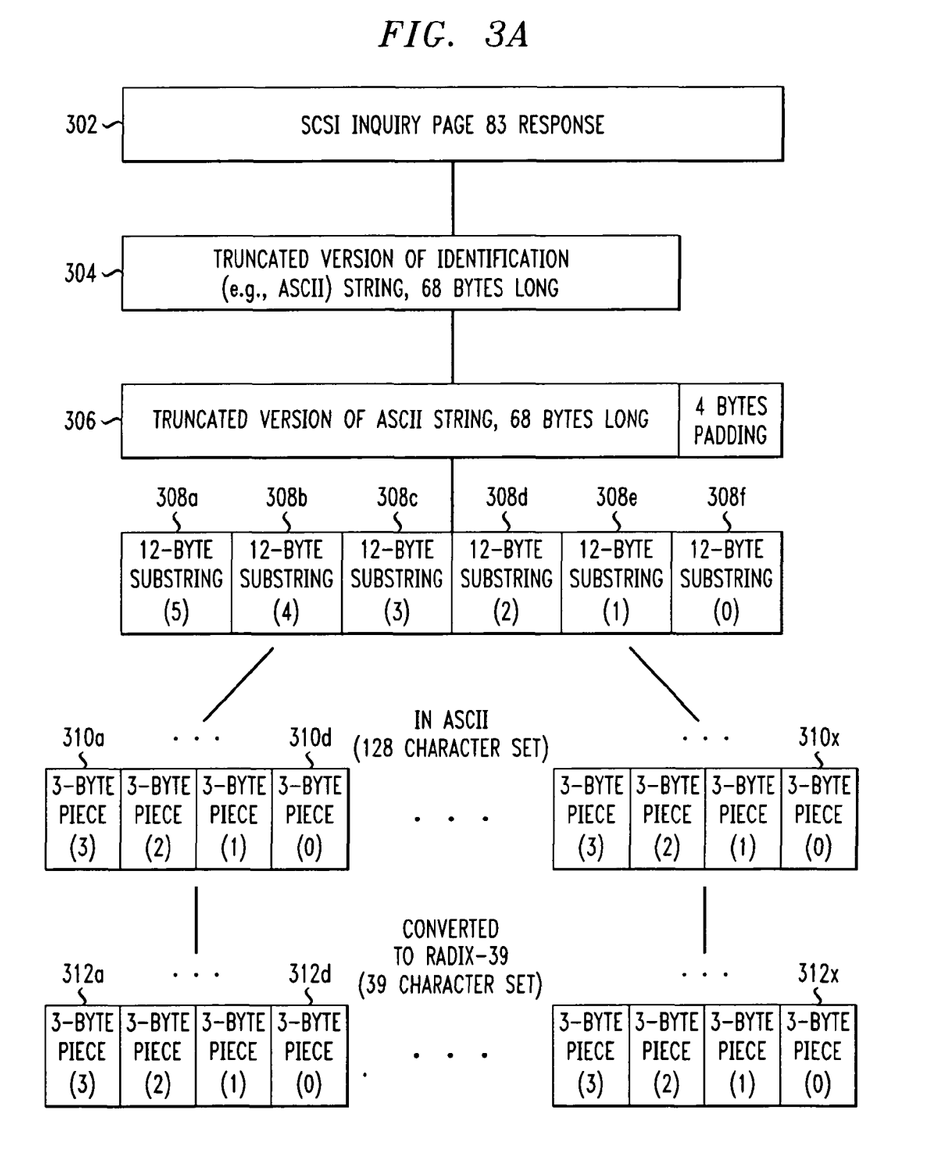
FIG. 3A shows a diagram of bit-level manipulations employed by an exemplary implementation of the methods shown in FIGS. 1 and 2.
Figure 3B:
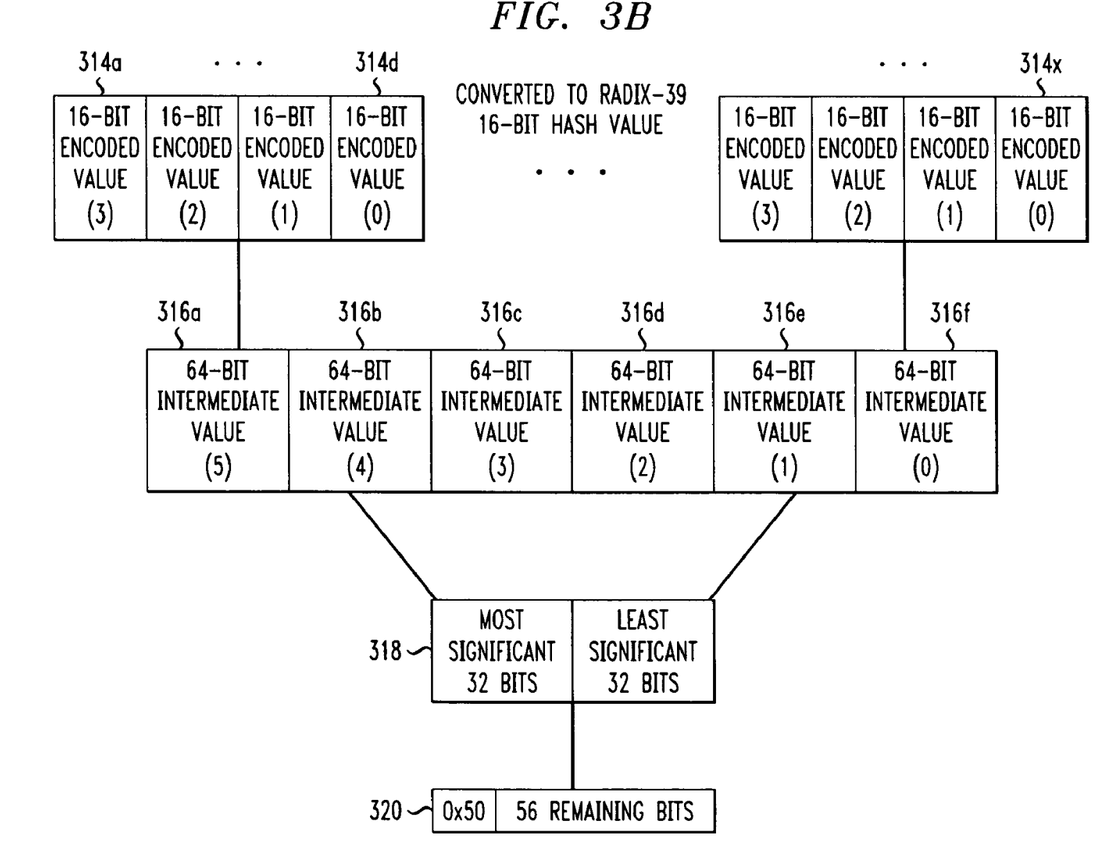
FIG. 3B shows a diagram of bit-level manipulations employed by an exemplary implementation of the methods shown in FIGS. 1 and 2.

FIGS. 3A and 3B show a diagram of the bit-level manipulations performed in accordance with an exemplary embodiment of method 100. As shown in FIG. 3A, string 302 might be the ASCII identification string for a disk, as reported on page 83 of the SCSI Inquiry that is reported, for example, at step 102 shown in FIG. 1. At step 104 of FIG. 1, the ASCII identification string is truncated so as to be 68 bytes long, as represented by string 304, and the ASCII identification string is padded with 4 additional bytes, as represented by string 306. At step 202 of FIG. 2, the padded string is divided into six 12-byte substrings, represented by substrings 308a-f, and at step 204, each substring is divided into four 3-byte pieces, as represented by pieces 310a-x in FIG. 3A.

Each byte of a portion preferably represents one ASCII character. At step 206 of FIG. 2, each byte of each portion is converted from a standard ASCII 128 character set to a radix-39 character set, represented by radix-39 pieces 312a-x in FIG. 3A. At step 208, the equation $X=(C1*1521)+(C2*39)+C3$ is evaluated to generate the 16-bit hash encoded value for each 3-byte piece, as represented by 16-bit encoded values 314a-x in FIG. 3B.

At step 210, the 16-bit hash values for each piece of a substring are combined into a 64-bit intermediate value, represented by intermediate values 316a-f in FIG. 3B. At step 110 of FIG. 1, the intermediate values for each substring are combined by an exclusive-or operation into a candidate value 318 of FIG. 3B. Also at step 110, candidate value 320 is generated by swapping the most significant 32 bits and the least significant 32 bits of the candidate value, and setting the most significant byte to a predetermined value. At step 112, if candidate value 320 is not a duplicate of a previously generated value, it is saved to the list of previously generated candidate values and is provided as the system-wide name.

One skilled in the art would realize that byte-swapping of step 110 might be employed to place active bits in an advantageous position, but other embodiments might not employ byte-swapping.

Figure 4:
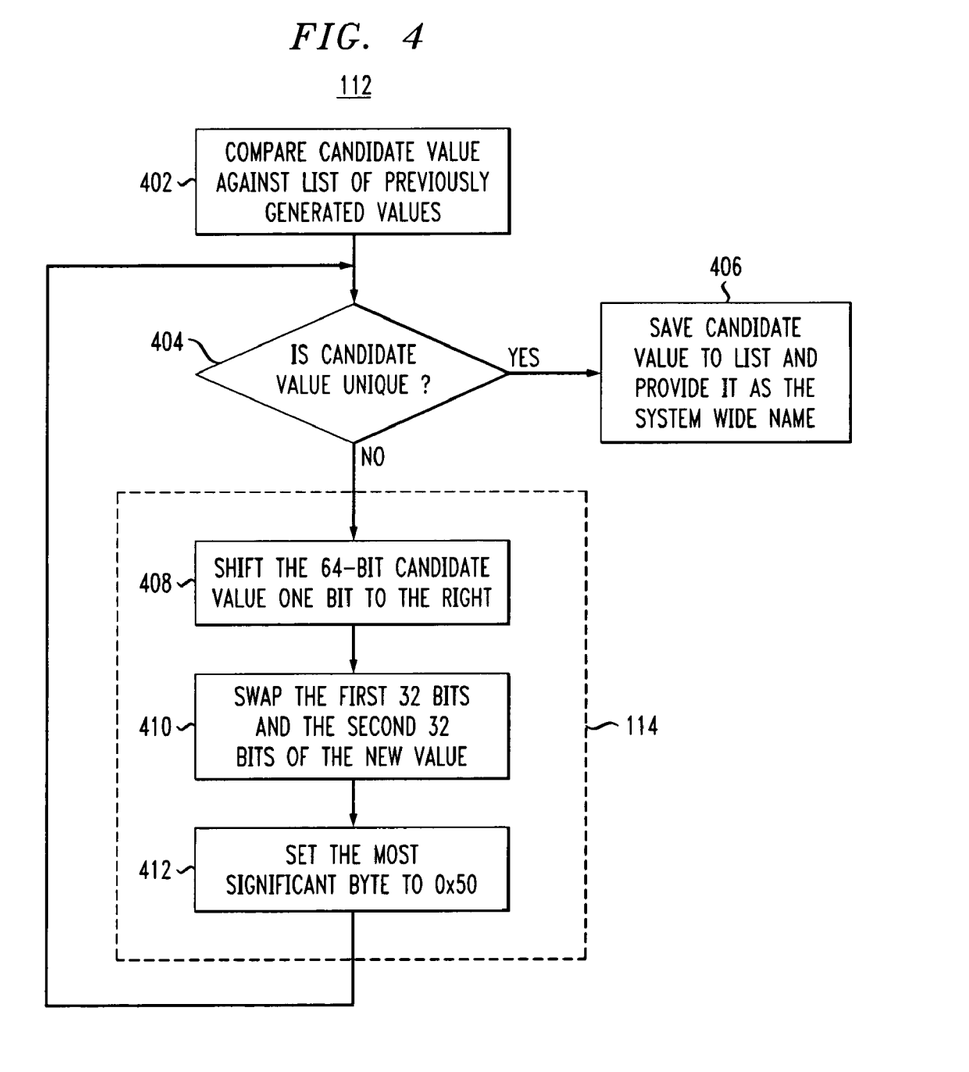
FIG. 4 shows exemplary sub-steps for the method shown in FIG. 1 to generate a new candidate value.

FIG. 4 shows a block diagram of step 112 shown in FIG. 1 in accordance with an exemplary embodiment of the present invention. At step 402, candidate value 320 (FIG. 3B) is compared to elements in the list of previously generated candidate values. At step 404, if the candidate value is not substantially equivalent to a previously generated value, at step 406, candidate value 320 is saved to the list of previously generated candidate values and is provided as the system-wide name for the disk.

If candidate value 320 is substantially equivalent to a previously generated value, at step 408, the 64-bit candidate value is shifted to the right by one bit. At step 410, the most significant 32 bits and the least significant 32 bits of the new candidate value are swapped, and the most significant byte of the new candidate value is set to a predetermined value. The method then returns to step 404, where the new candidate value is compared to elements of the list of previously generated candidate values. Processing may continue until generation of a non-duplicate candidate value, or until some threshold is met (e.g., a timeout or a predetermined number of iterations has been performed).

An advantage of embodiments of the present invention is that two or more array controllers might independently calculate the same candidate (identifier) value before the controllers communicate to coordinate the "name" assignment. In addition, In some embodiments, the system tracks both the hash identifier and the original input string as a pair so that the ASCII string that corresponds to the system-wide name might be re-generated for user-friendly display.

The handling of duplicate candidate (identifier) values is complicated by the fact that the two controllers may not discover the disks in the same order. We need a way to discriminate which one came "first". Given two strings that hash to the same value, we calculate a value for the "second" one based on the first. The easy option is to not tolerate duplicates at all. If two disks generate the same identifier, then we would not discover or configure either one (or more if we get really unlucky). That is the current method employed in my current implementation. I have an empirical test capability where I have processed literally millions of these Inquiry strings without duplication. For the practical requirements of my system, that is a good implementation. A disk array configuration contains positional information such as the tray and slot indexes for a given disk. Those index values can form a way to determine the order of the assigned names. One could implement an indirection table to connect the name to the topology. One could pre-scan the disks to determine if the duplicates exist, and if so, using the positional information to choose the proper instance as the assigned name.

Exemplary embodiments of the present invention are described herein employing radix-39 conversion as the radix-39 hash function might be advantageous for a specific implementation as a base for desired arithmetic operations by a given processing architecture. The radix-39 hash function allows for 40 characters, numbered 0-39, with the zero value assigned as a special, null character in the translation table and also assigned to the space character. The null entries in the table ensure that the radix-39 arithmetic might not be subject to an overflow condition. Space characters are generally the most common element in the input strings, and so the space characters don't add significant information to the random portion of the hash output value.

Alternative embodiments might expand the character set to 42 characters without a possible overflow condition ((41*1521)+(41*39)+41=64001). The two additional character values might be significant in alternative implementations, but the Inquiry strings described herein might not use more than the three special characters in addition to the space character. In addition, methods might not decode as in exemplary embodiment described with respect to the FIGs. herein since multiple characters might be assigned the same value from the translation table. For example, a method might map lower case characters into the same values as upper case characters. While the lower case characters contribute in some manner to the information if the hash output value, lower case characters are rare in the actual strings for SATA disk drives. In this method, the original string parts might not be recoverable from the hash output value.

While exemplary embodiments of the present invention are described herein for condensing a string using radix-39 conversion, the present invention is not so limited. Other radix-M conversions (M a positive integer), such as radix-40, might be employed. One skilled in the art might employ other techniques for condensing data strings by removing redundant information. In addition, other methods might be employed to generate, for example, 16-bit hash building blocks.

For example, to generate 16-bit hash building blocks, the encoded value for each of group of four bytes might be provided by using a translation table, and limiting the alphabet to a maximum of 128 characters. To compose a 16-bit hash value, an accumulator is initialized to zero. An exclusive-or operation is employed to add the least significant encoded byte into the least significant seven bits of the accumulator. The encoded value for the second byte is shifted to the left by three bits, and it is added into the accumulator with an exclusive-or operation. The encoded value for the third byte is shifted by six bits, and it is added into the accumulator using an exclusive-or operation. Finally, the fourth encoded value is shifted by nine bits, and it is added into the accumulator with an exclusive-or operation, for a total of 16 bits. An encoder might be employed for three-byte groups by using a shift count of five, with an alphabet of 64 characters. The encoded values might be shifted into the accumulator from the top or the bottom, or alternating even. The combination operations might also include and, not-and, or, and not-or. In order maintain potentially useful information, the shift operations described above might be exchanged for rotate operations in either direction, and an add operation discarding the last carry bit might also be employed.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

While the exemplary embodiments of the present invention have been described with respect to processing blocks in a software program, the present invention is not so limited. As would be apparent to one skilled in the art, various functions of such software processes may also be implemented as processes of circuits, including possible implementation as a single integrated circuit, a multi-chip module, a single card, or a multi-card circuit pack. Such software may be employed in, for example, a digital signal processor, micro-controller, or general purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

I claim:

1. A method of generating an identifier for a disk, the method comprising the steps of:
    requesting an ASCII identification string for the disk;
    generating a padded string by the steps of truncating the ASCII identification string to be 68 bytes long and padding the ASCII identification string by adding 4 bytes to a least significant end of the string;
    dividing the padded string into six 12-byte substrings from a most significant end to a least significant end of the padded string and dividing each substring into four 3-byte pieces from a most significant end to a least significant end of the substring;
    generating an encoded value for each 3-byte piece by the steps of converting each byte of each 3-byte piece from a standard ASCII character set to a radix-39 character set and if a byte does not fit the radix-39 character set, setting the byte to a predetermined value, then generating a 16-bit binary hash encoded value for each byte of each 3-byte piece by multiplying the most significant converted byte by 1521, adding the result to the middle byte multiplied by 39, and adding the result to the least significant byte;
    generating a candidate value compatible with a Word-Wide Name ("WWN") by the steps of combining the encoded values for each of the four 3-byte pieces of each substring into a concatenated 64-bit value, combining the concatenated 64-bit values for each substring into one 64-bit candidate value by an exclusive-or operation, swapping the most-significant 32 bits of the candidate value with the least significant 32 bits of the candidate value, and setting the most-significant byte of the candidate value to a predetermined value;
    comparing the candidate value to a list of previously generated candidate values and if the candidate value differs from the values in the list, including the candidate value in the list of generated values; and
    providing the candidate value as the identifier for the disk.

2. A method of generating an identifier for a disk, the method comprising the steps of:
    requesting an identification string for the disk;
    generating a padded string by the steps of processing the identification string into a predetermined number of bytes;
    dividing the padded string into portions, wherein dividing the padded string further comprises:
        dividing the padded string into six 12-byte substrings from a most significant end to a least significant end of the padded string; and
        dividing each substring into four 3-byte pieces from a most significant end to a least significant end of the substring;
    generating an encoded value for each portion;
    combining two or more encoded values for the portions into a candidate value;
    comparing the candidate value to a list of previously generated candidate values and if the candidate value differs from the values in the list, including the candidate value in the list of generated values; and
    providing the candidate value as a system-wide name for the disk.

3. A method of generating an identifier for a disk, the method comprising the steps of:
    requesting an identification string for the disk;
    generating a padded string by the steps of processing the identification string into a predetermined number of bytes;
    dividing the padded string into portions;
    generating an encoded value for each portion, wherein generating an encoded value further comprises:
        converting each byte of each portion from a standard character set to a radix-39 character set;
        if a byte does not fit the radix-39 character set, setting the byte to a predetermined value; and
        generating a 16-bit binary hash encoded value for each portion;
    combining two or more encoded values for the portions into a candidate value;
    comparing the candidate value to a list of previously generated candidate values and if the candidate value differs from the values in the list, including the candidate value in the list of generated values; and providing the candidate value as a system-wide name for the disk.

4. The method of claim 3, wherein the step of generating a 16-bit binary hash encoded value for each portion comprises:

multiplying the most significant converted byte by 1521;
adding the result to the middle byte multiplied by 39;
adding the result to the least significant byte; and
providing a 16-bit binary hash encoded value between 0 and 60879.

5. The method of claim 4, wherein the step of combining the encoded values into a candidate value comprises:

combining the encoded values for each portion into at least one concatenated 64-bit number; and
combining multiple concatenated 64-bit numbers into one 64-bit candidate value by an exclusive-or operation.

6. The method of claim 5, wherein each portion comprises four 3-byte pieces for each of six 12-byte substrings.

7. The method of claim 3, wherein the predetermined value is zero.

8. A method of generating an identifier for a disk, the method comprising the steps of:

requesting an identification string for the disk;
generating a padded string by the steps of processing the identification string into a predetermined number of bytes;
dividing the padded string into portions;
generating an encoded value for each portion;
combining two or more encoded values for the portions into a candidate value, wherein combining two or more encoded values further comprises:
    swapping the most-significant upper-half bits of the candidate value with the least significant lower-half bits of the candidate value; and
    setting the most-significant byte of the candidate value to a predetermined value;
comparing the candidate value to a list of previously generated candidate values and if the candidate value differs from the values in the list, including the candidate value in the list of generated values; and
providing the candidate value as a system-wide name for the disk.

9. The method of claim 8 where the predetermined value is 0x50.

10. The method of claim 8, wherein the candidate value is a 64-bit value, and wherein the step of swapping comprises swapping the most-significant 32 bits of the 64-bit candidate value with the least significant 32 bits of the candidate value.

11. A method of generating an identifier for a disk, the method comprising the steps of:

requesting an identification string for the disk;
generating a padded string by the steps of processing the identification string into a predetermined number of bytes;
dividing the padded string into portions;
generating an encoded value for each portion;
combining two or more encoded values for the portions into a candidate value;
comparing the candidate value to a list of previously generated candidate values and if the candidate value differs from the values in the list, including the candidate value in the list of generated values, wherein comparing the candidate value to a list of previously generated values further comprises:
    when the candidate value is equal to a previously generated value, generating a new candidate value by shifting the candidate value one bit to the right;
    swapping the most-significant upper-half bits of the new candidate value with the least significant lower-half bits of the new candidate value;
    setting the most-significant byte of the new candidate value to a predetermined value; and
    comparing the new candidate value to the list of previously generated values; providing the candidate value as a system-wide name for the disk.

* * * * *